J. B. Holmes.
Water Wheel.

No. 91,017.  Patented Jan. 8, 1869.

Witnesses:

Inventor:
J. B. Holmes
per M. Wm & Co.
Attorneys

United States Patent Office.

J. B. HOLMES, OF LAWRENCE, KANSAS.

Letters Patent No. 91,017, dated June 8, 1869.

IMPROVEMENT IN WATER-WHEELS.

The Schedule referred to in these Letters Patent and making part of the same.

*To all whom it may concern:*

Be it known that I, J. B. HOLMES, of Lawrence, in the county of Douglas, and State of Kansas, have invented a new and useful Improvement in Current-Wheels; and I do hereby declare that the following is a full, clear, and exact description thereof, which will enable others skilled in the art to make and use the same, reference being had to the accompanying drawings, forming part of this specification.

This invention relates to improvements in wheels, to be operated by the natural current of streams, for elevating water or propelling machinery; and consists in the arrangement and connection of the buckets together, and to the elevator or other device to be propelled.

Figure 1:
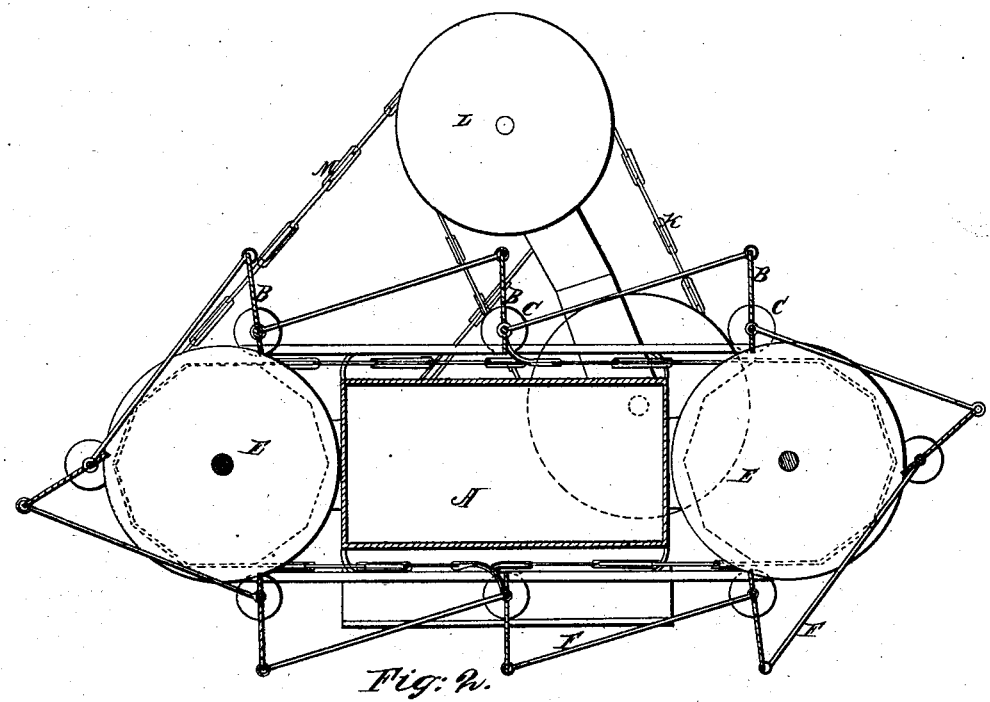

Figure 1 represents a longitudinal sectional elevation, and

Figure 2:
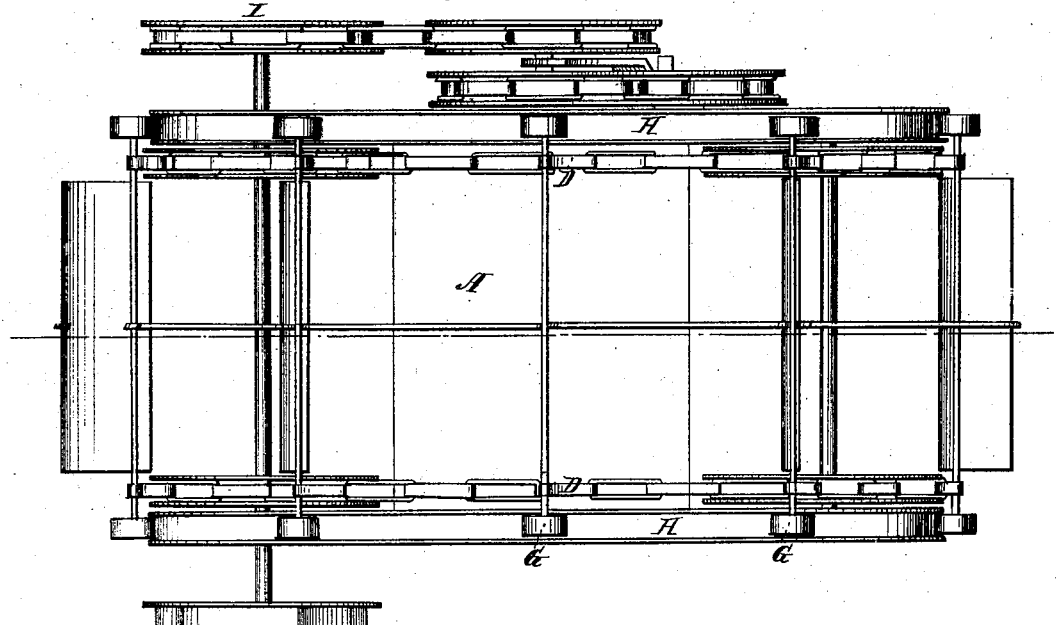

Figure 2, a plan view of the same.

Similar letters of reference indicate corresponding parts.

A represents a boat or raft to be anchored in the stream, for supporting the buckets, or floats, and their adjuncts.

B represents the buckets supported on the shafts C, running transversely of the float, and journalled in the endless chains D, running lengthwise of the float, over pulleys E, supported at each end of the float, so as to carry the said chains over and under the float.

The said buckets are connected by rods F, secured to their outer edges and to the shafts C next behind them, by which they are always maintained in a vertical position.

The shafts C project at each end beyond the chains D, and carry rollers G, which work on ways H, supported upon the float A, for assisting in keeping the chains taut and guiding the buckets.

The apparatus thus constructed, and anchored in the current of a stream, will have motion imparted to the buckets, which may be communicated to other apparatus by means of chain or belt wheels I, connected to one or both of the shafts of the guide-wheels E, and in this application I have represented an elevator-chain, K, as being operated by a wheel, L, and belt, or chain M, from one of the shafts of the guide-wheels E.

Two or more of these elevators may be provided, to be operated together or separately, and the water raised thereby may be carried off for irrigation or propelling other wheels, in any preferred manner.

Having thus described my invention,

I claim as new, and desire to secure by Letters Patent—

1. The buckets B, supported on the chains D, and connected by the rods F, arranged as and for the purpose specified.

2. The shafts C of the buckets, provided with the roller G, and connected to the chains D, the ways H, and the guide-wheels E, when all arranged as and for the purpose specified.

J. B. HOLMES.

Witnesses:
JAMES TALLEY,
ORVILLE IRWIN.